United States Patent [19]

Malone et al.

[11] Patent Number: 4,759,486
[45] Date of Patent: Jul. 26, 1988

[54] CONTROLLED ENVIRONMENT CHAMBER FOR USE IN CLADDING A NONALUMINUM CORE WITH ALUMINUM

[75] Inventors: William M. Malone; Malcolm J. Fraser, both of Pittsburgh, Pa.

[73] Assignee: Copperweld Corporation, Pittsburgh, Pa.

[21] Appl. No.: 735,545

[22] Filed: May 20, 1985

Related U.S. Application Data

[62] Division of Ser. No. 585,328, Mar. 1, 1984.

[51] Int. Cl.$^4$ ............................................... B23K 20/14
[52] U.S. Cl. ...................................... 228/148; 228/219; 228/5.1; 228/42; 228/44.3; 228/49.1; 228/17
[58] Field of Search ................ 228/148, 219, 173–177, 228/5.1, 42, 44.3, 49.1

[56] References Cited

U.S. PATENT DOCUMENTS

| | | | |
|---|---|---|---|
| 1,685,269 | 9/1928 | Bundy . | |
| 3,220,106 | 11/1965 | Clark | 29/473.9 |
| 3,220,666 | 5/1967 | Dion | 29/473.3 |
| 3,355,795 | 12/1967 | Clark | 29/481 |
| 3,372,465 | 3/1968 | Frieling | 29/474.1 |
| 3,408,727 | 11/1968 | Dion | 29/474.1 |
| 3,443,305 | 5/1969 | Matsuda et al. | 29/474.1 |
| 3,444,603 | 5/1969 | Dion et al. | 29/33 |
| 3,444,610 | 5/1969 | Thomson | 29/470.1 |
| 3,455,016 | 7/1969 | Dion et al. | 29/474.1 |
| 3,600,790 | 8/1971 | Dion | 29/474.1 |
| 3,714,701 | 2/1973 | Dion et al. | 29/474.1 |
| 4,227,061 | 10/1980 | Westfall et al. | 219/9.5 |
| 4,331,283 | 5/1982 | Fraser | 228/130 |

FOREIGN PATENT DOCUMENTS 10929  3/1971  Japan .................................. 228/219

Primary Examiner—Nicholas P. Godici
Assistant Examiner—Samuel M. Heinrich
Attorney, Agent, or Firm—Arnold B. Silverman

[57] ABSTRACT

A method of cladding a nonaluminum core with at least one aluminum cladding strip by preheating both the core rod and the strip with the former being preheated to about 1000° F. to 1300° F. and the latter being heated to about 600° F. to 1000° F. Cleaning the core rod and the strip and passing them through a controlled environment chamber containing a reducing or neutral gas. Lubricating the bonding roll grooves to provide a substantially continuous coating of lubricant thereon. Galling of the aluminum strip or strips to the bonding rolls is resisted as a result of this process.

5 Claims, 3 Drawing Sheets

CONTROLLED ENVIRONMENT CHAMBER FOR USE IN CLADDING A NONALUMINUM CORE WITH ALUMINUM

This is a division, of application Ser. No. 585,328 filed Mar. 1, 1984.

BACKGROUND OF THE INVENTION

1. Field Of The Invention

The present invention relates to an improved method for cladding a nonaluminum core with aluminum cladding in such fashion that undesired galling of aluminum to the bonding rolls is resisted.

2. Brief Description Of The Prior Art

It has been known to clad a metal rod with another metal so as to obtain certain beneficial properties of the core material combined with the desired characteristics of the cladding material. Economic benefits are obtained through the relatively limited use of the generally more expensive cladding material. See generally, U.S. Pat. Nos. 3,714,701; 4,227,061; and 4,331,283. In known systems, it has been suggested to employ one or two metal cladding strips composed of a first material to permit solid phase bonding of the cladding strip or strips about the circumference of a preheated core member of a second material, which may be steel.

For many uses, the clad product is subsequently reduced in diameter, as by a drawing operation, in order to provide a uniformly clad product of the desired dimensions.

It has also been known to provide an aluminum cladding on a steel core by use of powdered aluminum, aluminum strip or aluminum extrusion in creating the cladding.

One of the problems experienced in connection with aluminum cladding on steel, particularly in connection with the cladding of medium and high carbon steel core materials, has been the galling of aluminum to the bonding rolls. This problem is compounded as a result of the need to (a) provide for effective cleaning of both the steel core rod and the aluminum strip, (b) maintain the surfaces cleaned after such cleaning prior to effecting bonding while preheating both components to an adequate temperature to permit effective bonding and (c) maintain cladding speeds which are commercially acceptable.

There remains, therefore, a very real and substantial need for a process for producing a clean, continuously clad product which is provided with a solid aluminum cladding.

SUMMARY OF THE INVENTION

The present invention provides a method of cladding a core with at least one aluminum cladding strip by preheating the core rod and the strip within certain critical temperature ranges, positioning the cladding strip or strips around the core rod and effecting solid phase bonding of the cladding strip or strips to the core rod while the core rod and the strip are advancing. The method includes providing a pair of cooperating grooved bonding rolls for effecting the bonding, cleaning the cladding strip and core prior to effecting the bonding and heating the core when it is steel to about 1000° F. to 1300° F. and the aluminum strip to about 600° F. to 1000° F., both prior to effecting the bonding. The cleaned steel core and aluminum strip are then passed through a controlled environment chamber containing a reducing or neutral gas prior to effecting the bonding. The bonding rolls are lubricated to provide a substantially continuous coating of lubricant thereon thereby producing an effectively solid phase bonded aluminum clad steel core product while resisting galling.

The reducing or neutral gas, which may consist of a preferred mixture of dissociated ammonia and nitrogen, is also provided between the exit end of the controlled environment chamber and the rolls. This may be accomplished by impinging a first stream of gas directly toward the mating surfaces of the rolls and additional gas streams providing a screen adjacent the rolls.

It is an object of the present invention to provide an improved method of cladding a core rod with aluminum strip by forming an aluminum envelope of high integrity while resisting undesired galling.

It is a further object of the present invention to provide such a method wherein effective control of temperature, lubricant, clean mating surfaces and speed of bonding are provided.

It is a further object of the present invention to provide such a method which is economical to employ and efficient to use.

These and other objects of the invention will be more fully understood from the following description of the invention on reference to the illustrations appended hereto.

DESCRIPTION OF THE PREFERRED EMBODIMENTS

As used herein the term "low carbon steel" will refer to steel having less than about 0.16% carbon, the term "medium carbon steel" will refer to steel having about 0.16 to 0.30% carbon and "high carbon steel" will refer to steel having a carbon content of greater than about 0.30%.

In the interest of simplicity of disclosure herein reference to "rod" shall be deemed to include wire.

The method of handling the individual cladding strips and the core rod, as well as the post bonding handling apparatus, may take the form of known conventional systems or other appropriate apparatus. The specification of U.S. Pat. No. 4,227,061 is expressly incorporated herein as an example of such apparatus.

Figure 1:
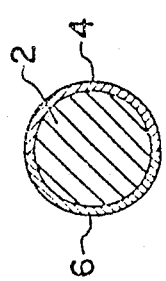
FIG. 1 is a cross-sectional illustration of a form of clad product produced by the present invention.

As is shown in FIG. 1, the final bonded product will consist of a core rod 2 to which are bonded one or more aluminum cladding strips so as to provide complete coverage by the aluminum of the core rod.

While for convenience of disclosure herein specific reference will be made to the use of a steel core, it will be appreciated that the invention is not so limited and may be employed with core material which need not be a carbon steel—but may include compositions across the broad spectrum of metallurgical application—including alloy steels, nickel iron alloys and other—meeting the criteria (mechanical, physical or economic) dictating an advantageous usage in combination with aluminum cladding as a bimetallic rod or wire. Such other materials shall be deemed to be embraced within the expression nonaluminum metallic composition or nonaluminum metallic core herein unless an express contrary qualification is set forth in connection with a specific use.

Figure 2:
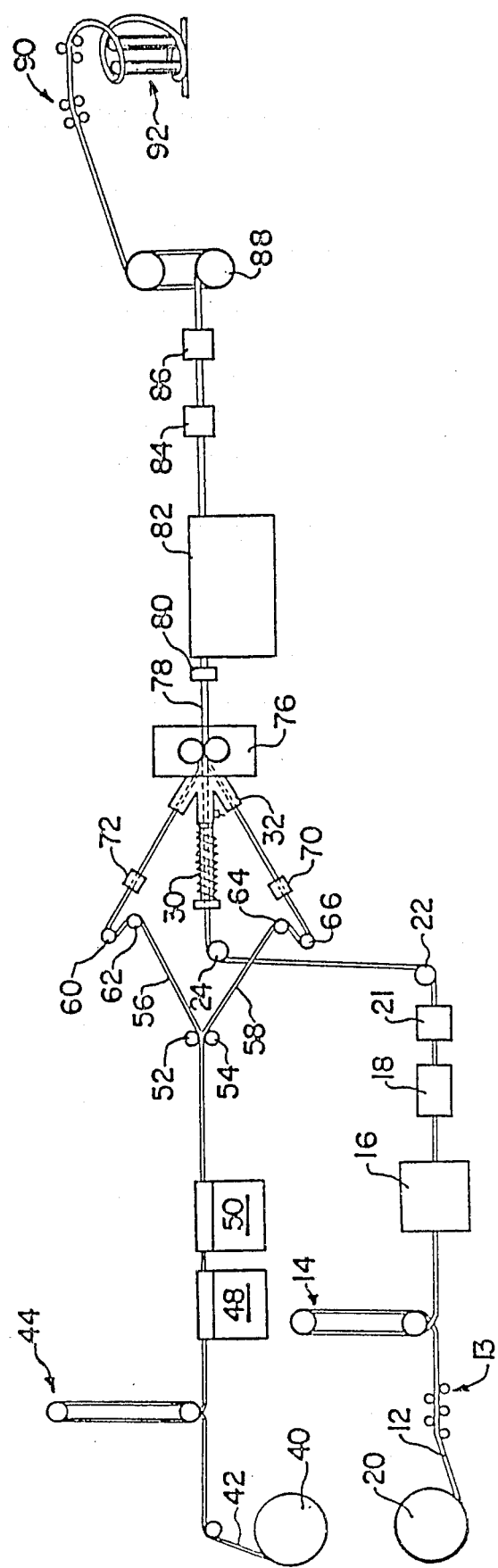
FIG. 2 is a schematic illustration of the method of the present invention.

Referring to FIG. 2, it is seen that a reel 2 provides a supply of the nonaluminum metallic core rod 12 which is to be clad with the aluminum. In the form illustrated, the rod 12 passes through a straightener 13 and then an accumulator 14. The accumulator 14 serves to permit continuous operation of the line by accumulating a store of feed material which can be run into the line while the payoff infeed to the accumulator is stopped to permit end to end welding of the rod or strip as the case may be thereby introducing a new supply of material to the system without interrupting the flow of material through the bonding stage.

After emerging from the accumulator 14, the nonaluminum metallic composition rod passes through a grit blaster 16 (or other suitable cleaning means such as a high pressure water/slurry descaler or continuous grinder, for example) wherein the external surface of the nonaluminum metallic core rod 12 is subjected to mechanical cleaning. After emerging from the mechanical cleaning stage, the nonaluminum metallic core rod 12 is subjected to a chemical cleaning as by passing through vat 18 of alkaline or acid cleaning material and is subsequently subjected to a water rinse in chamber 21. The chemical cleaning may, for example, take the form of an inhibited phosphoric acid at 145° F. followed by a cold water rinse. The cleaned nonaluminum metallic core rod 12 is then directed by means of guide rollers 22, 24 to a preheating station. In the form shown, preheating is accomplished by mean of an induction heating coil 30. The nonaluminum metallic core rod 12 is preferably preheated to a temperature of about 1000° F. to 1300° F. by means of the induction heating coil 30. The nonaluminum metallic core rod which preferably has a diameter not greater than about ½ inch is then passed into the controlled environment chamber 32 which is a sealed chamber provided with a suitable reduction or neutral gas so as to resist oxidation of the exterior surface of the nonaluminum metallic core rod 12 before it enters the bite of the bonding rolls 76. The aluminum cladding strip preferably has a thickness of about 0.015 to 0.080 inch and, where two such strips are employed, they generally will have a width of about 0.350 to 0.700 inch.

It will be appreciated that the aluminum cladding may be provided by a single aluminum strip which is wrapped around the nonaluminum metallic core rod, two such strips or more than two such strips. A presently preferred practice of the invention is to employ two strips which are adapted to be of equal width and wrapped around the nonaluminum metallic core rod 12 so as to place the aluminum strips in edge to edge bonded abutting relationship. Alternately, two strips which overlap could be used. In FIG. 2, the two supply reels for the aluminum strip are so positioned so as to appear as one. It will be appreciated that two such reels are disposed in side-by-side relationship and the feed may be accomplished in generally the same manner for both. Payoff reel 40 provides strip 42 which passes through accumulator 44 and then enters cleaning tank 48 wherein dirt, rolling oils, dust and undesired aluminum oxide are removed. Cleaning may be accomplished for example, by a suitable alkaline cleaner or an acid medium. After emerging from the cleaning tank 48, the aluminum strips 42 enter the rinse 50 which may be water at about 160° F. Guide rolls 52, 54 and bridle rolls 60, 62, 64, 66 serve to direct the two aluminum strips 56, 58 to their respective contacts 70, 72 which, in the form shown, may be an electrical resistance heating system. The aluminum strips are preferably preheated to a temperature of about 600° F. to 1000° F. in order to provide for edge to edge bonding, if desired, and a high level of bonding to the nonaluminum metallic core rod 12 without undesired galling of the aluminum to the bonding rolls 76. The aluminum strips 56, 58 enter the controlled environment chamber and ultimately pass into the bonding rolls 76 for bonding in a manner which will be described hereinafter.

The clad product 78 emerges from the bonding rolls and passes through a diameter monitor 80 which may be in the nature of a size guage to obtain information regarding the clad product dimension which information may be employed in setting the roll gap. After that, the product passes through a water quench 82 which may conveniently be a tank of water at about 65° F. In general, cladding of this type will produce a pair of diametrically opposed outwardly projecting aluminum fins which should be removed to establish a generally cylindrical product. This may be accomplished by a conventional skiving tool 84. After removal of the fins, a shaping die or roller set in the form of a fin rounding tool 86 may be provided. Capstan 88 then receives the product and contributes to maintaining the desired tension of the workpiece as it passes through the system. In the form illustrated, the clad product passes from the capstan to a down coiler 90 and ultimately to a takeup carrier 92. It will be appreciated that either directly from the capstan or from the takeup carrier 92, the product may be subjected to further working as by drawing the clad product to reduce its cross sectional up to about 95%, for example.

Figure 3:
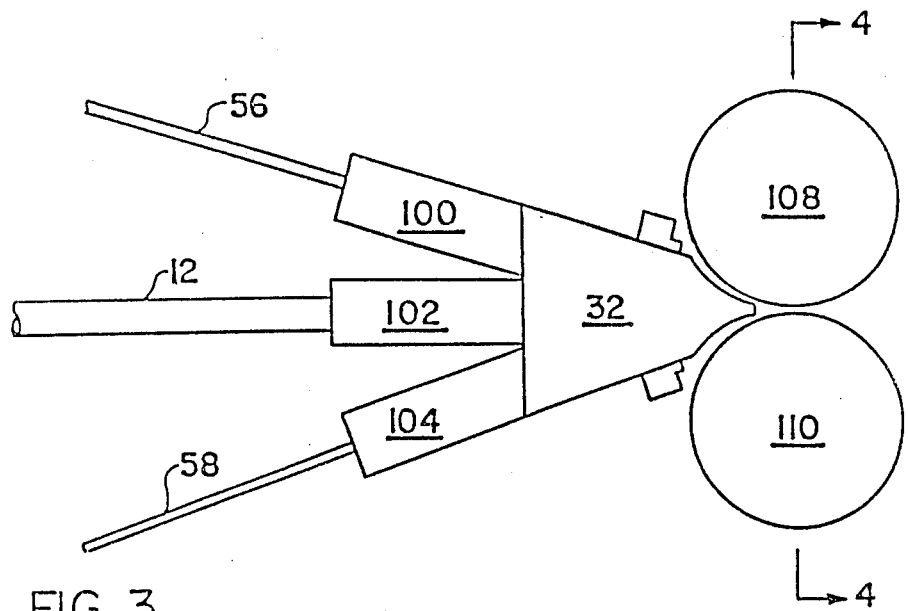
FIG. 3 is a schematic view of a portion of the controlled environment chamber and the associated bonding rolls.
Figure 4:
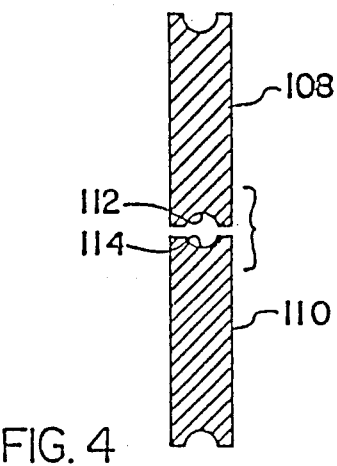
FIG. 4 is a cross-sectional illustration of the bonding rolls taken through 4—4 of FIG. 3.
Figure 5:
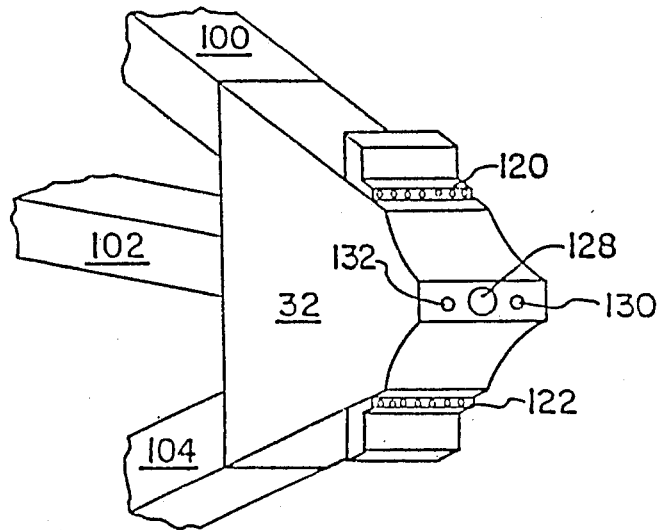
FIG. 5 is a perspective view of a form of controlled environment chamber of the present invention.

Referring now to FIGS. 3 through 5, further details of the controlled environment chamber and the bonding rolls will be considered. The controlled environment chamber in the form shown has a housing which converges toward the bonding rolls. It has an entry end with a group of rearwardly projecting entrance guides 100, 102, 104 which, respectively, receive aluminum strip 56, nonaluminum metallic core rod 12 and aluminum strip 58. Introduced into the controlled environment chamber 32 by a suitable conduit which has an appropriate supply and valving is a reducing or neutral gas. This serves to provide a substantially air free chamber wherein the tendency of the aluminum strips 56, 58 and the nonaluminum metallic core rod 12 to oxidize prior to bonding, is resisted. A preferred gas for use in this purpose is a mixture of dissociated ammonia and nitrogen. In a preferred embodiment, the mixture comprises, on a volume basis, about 60 to 80% dissociated ammonia and about 30 to 40% nitrogen. Alternatively, up to 100% dissociated ammonia could be used. As is shown in FIG. 4, the bonding rolls 108, 110 (which have been shown with exaggerated relative spacing for clarity of illustration) are each provided with a circumferentially continuous annular groove 112, 114. As the elevated temperature nonaluminum metallic core rod 12 and aluminum strips 56, 58 are urged through the grooves, they are bonded to each other by the radial forces applied by the grooves.

In addition to providing the reducing or neutral or oxidation resisting gas within the controlled environment chamber 32, a further supply of gas is provided between the chamber or retort 32 and the rolls 108, 110 in order to minimize the risk of the cladding elements beginning to oxidize immediately upstream of the bite of the bonding rolls 108, 110.

As is shown in FIG. 5, the aluminum strips 56, 58 and nonaluminum metallic core rod 12 will emerge from opening 128. On opposed sides of the opening are gas ports 130, 132 which impinge streams of the gas directly into the bite of rolls 108, 110. Also, manifolds 120, 122 are provided with a plurality of gas outlets which tend to provide a shield of gas traveling along the exterior of the retort in a general direction toward the rolls.

Figure 6:
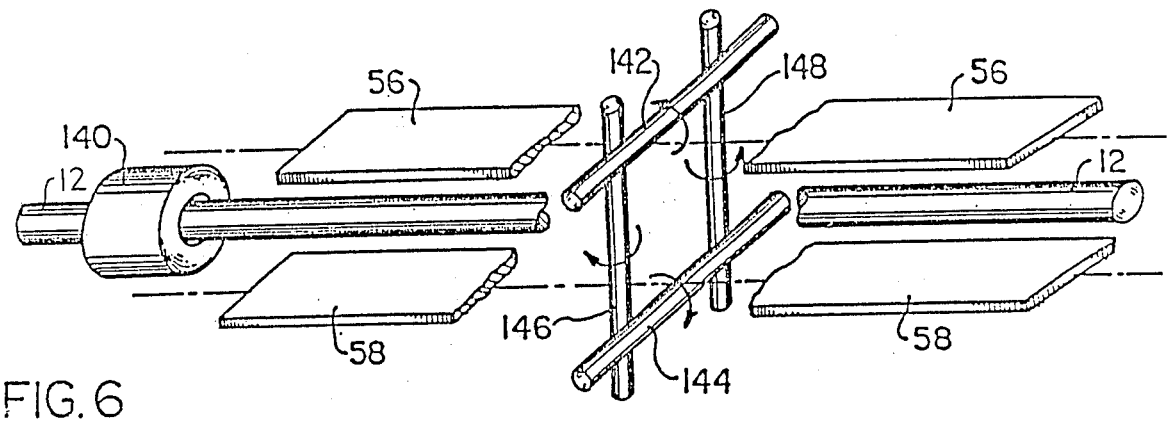
FIG. 6 is an exploded view showing a portion of the preferred support means disposed within the controlled environment chamber.

FIG. 6 illustrates a preferred means of additional guidance for the strips 56, 58 and rod 12 disposed within the chamber 32. In addition to providing a stationary nonaluminum metallic composition core rod guide 140, a plurality of rollers 142, 144, 146, 148 which are suitably rotatably mounted as by being journaled within appropriate bearings or bushings disposed within the chamber 32, serve to limit the maximum spacing between strips 56, 58 and also to preserve the desired relative alignment by limiting the lateral movement of strips through rolls 146, 148. In the form shown these define a generally rectangular opening.

Figure 7:
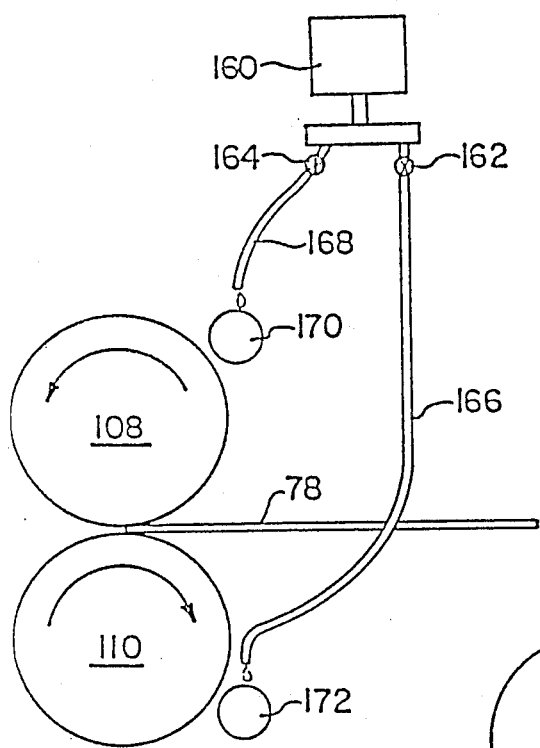
FIG. 7 is a schematic illustration of the preferred form of lubricant applying means of the present invention.
Figure 8:
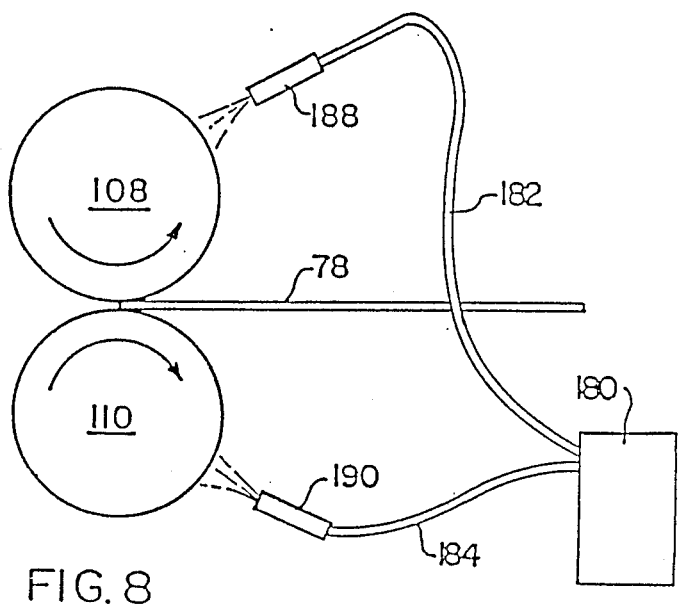
FIG. 8 is a schematic illustration of a preferred means for applying lubricant of the present invention.

Referring now to FIGS. 7 and 8, preferred approaches to providing effective and substantially continuous coatings of a suitable lubricant on the grooves of rolls 108, 110 will be considered. It will be appreciated that the present invention, by maintaining careful control of the relatively low temperatures employed with the nonaluminum metallic core rod 12 and aluminum strips 56, 58 combined with effective lubrication of the bonding rolls and providing the rolls are formed out of a preferred material, undesired galling is resisted. A preferred material out of which the bonding rolls are made is a tantalum containing tungsten carbide alloy.

In the schematic form shown in FIG. 7, a lubricant reservoir 160 is provided with a pair of outlet valves 162, 164 which, respectively, control flow of lubricant through conduits 166, 168. Doctor rolls 170, 172 are preferably felt covered and are in contact with the respective rolls 108, 110 in order to transfer lubricant from the surface of the doctor rolls 170, 172, respectively, to the grooves of rolls 108, 110. Among the preferred materials for use as a lubricant in this method are a synthetic oil with a high flash point or a petroleum based or synthetic water-miscible oil. A specific example of the former is a product sold under the designation HML 976-88 and an example of the latter is a product sold under the designation Soluble oil 1207, both being available from E. F. Houghton & Company. It is preferred to deliver about 0.0001 to 0.0005 gallons per minute of lubricating oil to each bonding roll.

Referring to FIG. 8, in this embodiment, an oil reservoir under suitable pressure for the intended purpose, has outlet conduits 182, 184 which, respectively, supply lubricant under pressure to spray guns 188, 190 which have their outlet nozzles directed to deposit lubricant on the grooves of rolls 108, 110.

It will be appreciated that the method of the present invention provides an effective means of solid phase bonding of one or more aluminum strips to a nonaluminum metallic core rod while resisting undesired galling. All of this is accomplished in a manner which is compatible with existing procedures and equipment.

It will further be appreciated that while reference has been made herein to a core which is in "rod form" and generally the rod will be of substantially cylindrical configuration, other profiles may be employed if desired.

Whereas particular embodiments of the invention have been described above for purposes of illustration, it will be evident to those skilled in the art that numerous variations of the details may be made without departing from the invention as defined in the appended claims.

We claim:

1. A controlled environment chamber for receiving at least one surface cleaned metal strip composed of a first metal and at least one core member of a surface cleaned core member of a second metal and directing said strip and core to bonding rolls while providing a reducing or neutral gas environment therewithin comprising
    a housing having an entry portion for receiving said strip and core member and an exit portion for discharging said strip and said core member toward said bonding rolls,
    gas discharge opening means for directing at least one stream of said gas toward said bonding rolls, whereby gas emerging from said gas discharge opening means will resist undesired exposure of the cleaned strip and core member to air guide means disposed within said housing for guiding the flow of said strip therethrough, said guide means having a first pair of roller means oriented generally parallel with respect to each other and a second pair of roller means oriented generally parallel with respect to each other.

2. The controlled environment chamber of claim 1 including
    said gas discharge opening means having first and second discharge means,
    said first discharge means being disposed adjacent to the opening from which said strip and said core member emerge for directing gas emerging therefrom generally in the direction of movement of said strip and said core member, and
    said second discharge means being disposed between said entry portion and said first discharge means.

3. The controlled environment chamber of claim 2 including
    said second discharge means having manifold means for directing a plurality of streams of said gas along the exterior of said housing toward said exit portion.

4. The controlled environmental chamber of claim 3 including
    said second discharge means having a pair of manifold means disposed on opposite sides of said housing.

5. The controlled environmental chamber of claim 1 including
    said first and second pairs of roller means defining a generally rectangular opening through which said strip and said core member will pass.

* * * * *